(12) United States Patent
D'Orso

(10) Patent No.: US 6,255,965 B1
(45) Date of Patent: Jul. 3, 2001

(54) DEVICE FOR AIDING THE PILOTING OF AN AIRCRAFT, ESPECIALLY A ROTARY-WING AIRCRAFT AND IN PARTICULAR A HELICOPTER

(75) Inventor: Michel D'Orso, Luynes (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/401,855

(22) Filed: Sep. 22, 1999

(30) Foreign Application Priority Data

Sep. 23, 1998 (FR) .................................................. 98 11858

(51) Int. Cl.⁷ .................................................. G08B 21/00
(52) U.S. Cl. .......................... 340/946; 340/971; 340/972; 340/973; 340/975; 701/16
(58) Field of Search ..................................... 340/946, 971, 340/972, 973, 975; 701/16

(56) References Cited

U.S. PATENT DOCUMENTS

| | | | |
|---|---|---|---|
| 4,368,517 | 1/1983 | Lovering | 701/16 |
| 5,675,327 * | 10/1997 | Coirier et al. | 340/973 |
| 5,745,054 * | 4/1998 | Wilkens | 340/972 |
| 5,842,142 * | 11/1998 | Murray et al. | 701/16 |
| 6,057,786 * | 5/2000 | Briffe et al. | 340/975 |
| 6,111,525 * | 8/2000 | Berlioz et al. | 340/971 |
| 6,111,526 * | 8/2000 | Aymeric et al. | 340/972 |

FOREIGN PATENT DOCUMENTS

| | | |
|---|---|---|
| 0044777 | 1/1982 | (EP) . |
| 0418558 | 3/1991 | (EP) . |
| 2666428 | 3/1992 | (FR) . |
| 2752051 | 2/1998 | (FR) . |
| 2202199 | 9/1998 | (GB) . |

\* cited by examiner

*Primary Examiner*—Benjamin C. Lee
(74) *Attorney, Agent, or Firm*—Stevens, Davis, Miller & Mosher, LLP

(57) ABSTRACT

The present invention relates to a device for aiding the piloting of an aircraft, especially a rotary-wing aircraft, in particular a helicopter.

According to the invention, said device (1) comprises first means (2) for determining, on the one hand, the slope and the heading of a preset path of the aircraft and, on the other hand, the slope and the heading of a flight path which the aircraft can take in order to join up with the preset path, and second means (3) for presenting, on a display screen (5), simultaneously a first characteristic sign (S1), whose position on the display screen (5) is representative of the slope and of the heading of the preset path and a second characteristic sign (S2), whose position on the display screen (5) is representative of the slope and of the heading of the flight path.

13 Claims, 4 Drawing Sheets

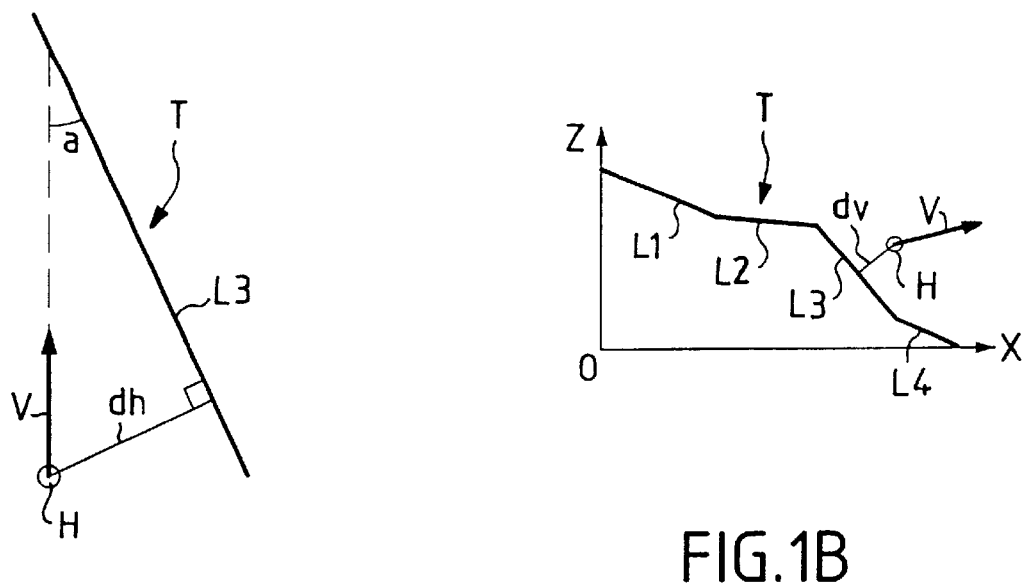
FIG.1A
FIG.1B
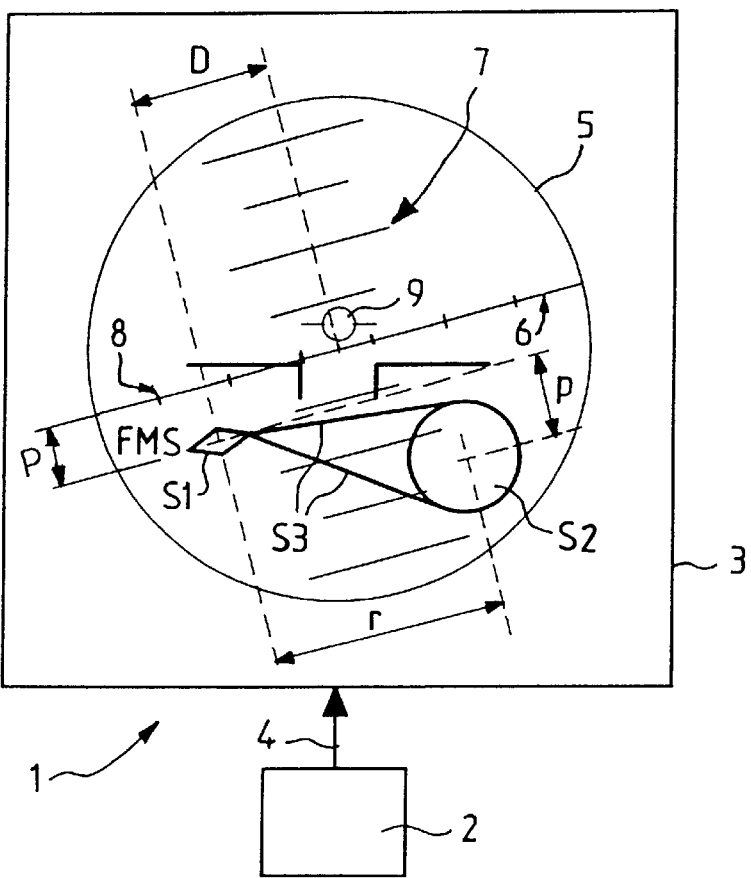
FIG.1C

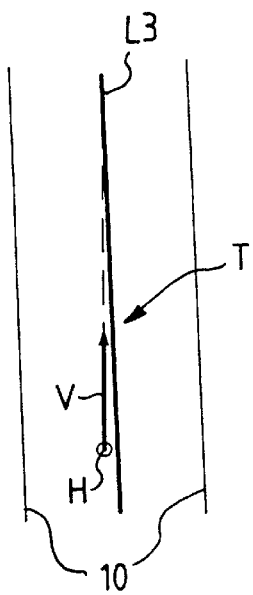
FIG.3A
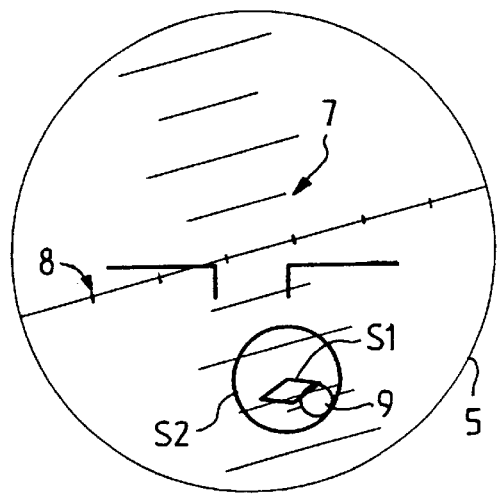
FIG.3C
FIG.3B
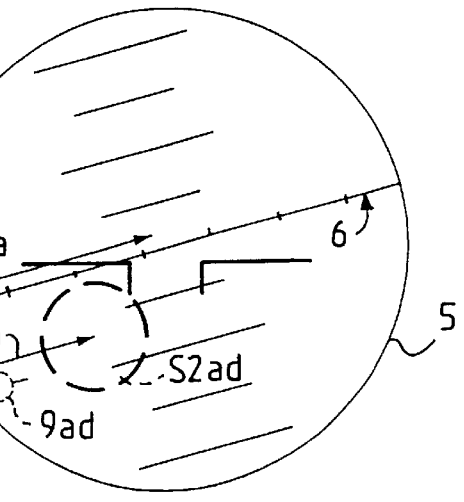
FIG.4

DEVICE FOR AIDING THE PILOTING OF AN AIRCRAFT, ESPECIALLY A ROTARY-WING AIRCRAFT AND IN PARTICULAR A HELICOPTER

BACKGROUND OF THE INVENTION

1. Field of the Invention

The present invention relates to a device for aiding the piloting of an aircraft, especially a rotary-wing aircraft and in particular a helicopter.

More precisely, it relates to a device making it possible to present information cues to a pilot of the aircraft, which are capable of providing the latter with indications regarding the exact position of said aircraft with respect to the surrounding space, especially in poor visibility, or even in the complete absence of visibility. Such cues are generally very useful, or even indispensable, when approaching a landing strip.

2. Description of Related Art

On aeroplanes, especially civil transport aeroplanes, a device for presenting cues of this type is known, and is associated with a guidance beam or axis (for example of the "ILS" type) transmitted from the ground in proximity to a landing strip and which is intended to guide the aeroplane during the approach to the strip, with a view to landing.

To this end, the known device provides the pilot(s) with two cues presented on a display screen, namely:

- a first cue ("LOC") comprising an arrow which the pilot must orient in terms of heading on the guidance axis and a deviation bar, whose lateral displacement on the screen with respect to the arrow is representative of the offset between the guidance beam and the position of the aircraft; and
- a second cue ("GLIDE") which indicates the relative vertical position between said guidance axis and the position of the aircraft.

These cues relate to values which are proportional to the angle between said guidance axis and the line of aim of the point at which the aircraft expects to touch down.

Such a known device for presenting cues is well suited to an approach made in a straight manner, with a fixed and relatively gentle slope, for example 3°, as is generally the case for an aeroplane.

However, when the approach has to be made according to a preset path which exhibits several successive segments exhibiting different headings and slopes, as well as relatively large values of slope of up to 15°, as may be the case for a helicopter, the aforesaid cues are not appropriate and are moreover inadequate.

This is because a cue in angular form obliges the pilot to pass through a particular point in space. Now, such a constraint is not useful in respect of the various points of transition of a path having a plurality of segments, with the exception of the last segment terminating in the landing strip.

Moreover:

- an approach at gentle slope, around 3°, is not well suited to the deployment capabilities of helicopters; and
- helicopters must be able to land on unprepared zones which are not furnished with guidance beams.

Consequently, the known and aforesaid device is not satisfactory for guidance along complex preset paths.

The document FR-2 666 428 describes a process for displaying pilot-aid symbols on a screen aboard an aircraft. This known document teaches in particular the displaying, according to a three-dimensional representation, of the approach segments situated on the path which the aeroplane must travel. To this end, the current segment of travel, as well as the next segment, are displayed respectively according to two parallelepipeds, in perspective.

Furthermore, the document FR-2 752 051 discloses a device for assisting the guidance of a vehicle over a path. This known device comprises means for determining the slope and the heading of a flight path which the vehicle can take in order to join up with a preset path and means for displaying a guidance window, into which must be brought and wherein must be maintained a symbol representing the speed vector of the aeroplane, during the guidance of the aeroplane. This guidance window is centered on a preset point which represents the direction of guidance to be followed by the aircraft, in terms of heading and slope. The coordinates of this preset point are defined by the point of intersection between a sphere (of fixed radius) centered on the position of the aeroplane and the preset path.

However, the pilot has no information regarding the discrepancies of slope and of heading between the preset and flight paths, and this may be very detrimental in certain flight conditions.

SUMMARY OF THE INVENTION

The object of the present invention is to remedy these drawbacks. It relates to a pilot-aid device capable of presenting to a pilot of an aircraft, and especially of a helicopter, cues enabling him to carry out, in a simple and efficient manner, piloting along a complex preset path, exhibiting for example a plurality of segments of different slopes and headings.

To this end, according to the invention, the device for aiding the piloting of an aircraft, especially a rotary-wing aircraft, in particular a helicopter, comprises:

- first means for determining the slope and the heading of a flight path which said aircraft can take in order to join up with a preset path; and
- second means for presenting, on a display screen, a second characteristic sign, whose position on said display screen is representative both of the slope and of the heading of said flight path, is noteworthy in that said first means moreover determine the slope and the heading of the preset path of the aircraft, in that said second means moreover present, simultaneously with said second characteristic sign, a first characteristic sign, whose position on said display screen is representative both of the slope and of the heading of said preset path, and in that said slope and said heading of the flight path are such that the distance between said first and second characteristic signs on said display screen is dependent:

- according to a first direction representing the heading, on the distance in a horizontal plane between the position of the aircraft and said preset path; and
- according to a second direction representing the slope, on the distance in a vertical plane between the position of the aircraft and said preset path.

Thus, by virtue of the invention, the pilot(s) is (are) presented not with cues in angular form, but with cues representative of distance offsets, specified below, thereby making it possible to remedy the aforesaid drawbacks.

Moreover, by virtue of the invention, cues are also provided which relate to the slope, both of the guidance path and of the preset path, this not being the case for the aforesaid device disclosed by the document FR-2 752 051. These cues provided simultaneously are necessary in particular when various segments of the preset path exhibit arbitrary slopes which may have high values. This is because, when the aircraft is for example situated below the preset path, it is necessary to know the slope of the latter so as to bring about a greater descent slope of the aircraft, so that it can join up with this preset path. Moreover, by virtue of the invention, the discrepancies in heading and in slope between said preset and guidance paths are deduced easily and rapidly by a pilot from the distances between said first and second characteristic signs, along said first and second directions respectively.

Furthermore, the device in accordance with the invention is not bound by a guidance axis and can be used anywhere.

Furthermore, preferably:

the discrepancy in slope p and the discrepancy in heading r between said preset and flight paths satisfy the following relations which depend on the distances dv and dh in meters m respectively in the vertical plane and the horizontal plane between the position of the aircraft (H) and said preset path (T):

if dv>25 m, p is proportional to $\sqrt{d}$
if dv<25 m, p is proportional to dv/5
if dh>25 m, r is proportional to $\sqrt{dh}$
if dh<25 m, r is proportional to dh/5; and when the preset path comprises a plurality of successive segments, the current segment, used to determine the slope and the heading of said preset path, is advantageously the one which is closest to the position of the aircraft.

It will be noted that within the context of the present invention, said display screen can be either a usual so-called "head down" screen provided on the aircraft's instrument panel, or a usual so-called "head up" screen, that is to say a transparent screen through which the pilot can see the exterior. This "head up" screen can be fixed with respect to the cabin or fixed with respect to the pilot's head.

In the case of a "head up" screen, the device in accordance with the invention makes it possible to render compatible a so-called "natural" piloting carried out by pilots and a so-called "instrument-based" piloting carried out by automatic piloting means, in the form of a single assisted natural piloting mode. The assistance so provided is incorporated into the natural piloting so as to enhance it without disturbing it.

Furthermore, advantageously, said second means moreover present, on said display screen:

a third characteristic sign, for example in the form of straight lines, linking together said first and second characteristic signs, thus making it possible to depict to the pilot the limits of the aerial course which he must follow in order to join up with said preset path and therefore eases the understanding and evaluation of the various cues presented; and/or a fourth characteristic sign indicating the direction in which the aircraft is flying, thereby easing and simplifying the piloting since it is then sufficient for the pilot to direct the aircraft so that said fourth characteristic sign is and remains superimposed on said second characteristic sign indicating the advised flight path; and/or a fifth characteristic sign indicating the direction of a point in space which will be reached by said aircraft within a specified duration, thus making it possible to join up with the preset path within said specified duration if the pilot carries out a piloting making it possible to superimpose this fifth characteristic sign on said second characteristic sign.

Furthermore, in order to yet further ease the understanding of the cues presented, advantageously, said second characteristic sign exhibits the shape of an ellipse, of variable geometric configuration, that is to say of variable shape and/or variable size. The shape of the ellipse can thus in particular vary, corresponding to the perspective view, from the aircraft, of a circle centered on the preset path. As regards the size of the ellipse, it can for example vary as a function of the actual speed of the aircraft, thus making it possible to provide the pilot with a speed cue in addition.

Another speed cue can be obtained by presenting a sixth characteristic sign, for example using dashes, which is associated with said second characteristic sign and is spaced therefrom by a distance dependent on the difference between the actual speed of the aircraft and a preset speed.

This provides a simple and effective aid to piloting since it is then sufficient to superimpose said sixth and second characteristic signs, so as to bring the actual speed of the aircraft to said preset speed and thus obtain suitable piloting.

Furthermore, advantageously, said second means can present, moreover, on said display screen;

at least one auxiliary sign which is intended to deputize for a characteristic sign which has exited the field of view represented on said display screen and which is situated, according to a field exit direction, at a predetermined distance from the actual position of said exited characteristic sign; and/or a first additional sign warning of a modification, within a predetermined duration, of the preset path, for example a change of heading and/or of slope. This first additional sign disappears when said first characteristic sign is superimposed thereon, that is to say when the path modification has been made; and/or a second additional sign indicating the position of the ground relative to a zone in space connected with said aircraft. This second additional sign is preferable associated with the fourth characteristic sign indicating the direction in which the aircraft is flying.

Moreover, in a preferred embodiment, this second additional sign is an arc of a circle, whose size varies as a function of position, and which is centered on said fourth characteristic sign. The appropriate piloting then assumes that said second additional sign becomes and remains a semi-circle.

BRIEF DESCRIPTION OF THE DRAWINGS

The figures of the appended drawing will elucidate the manner in which the invention may be embodied. In these figures, identical references denotes similar elements.

FIG. 1C diagrammatically represents a device in accordance with the invention, corresponding to a situation illustrated in a horizontal plane in FIG. 1A and in a vertical plane in FIG. 1B.

FIGS. 3A, 3B and 3C illustrate similar representations to those of FIGS. 1A, 1B and 1C respectively, for a relative position and a speed of the aircraft which are different.

FIGS. 4, 5 and 8 illustrate various types of presentation of cues.

DETAILED DESCRIPTION OF THE INVENTION

Figure 2A:
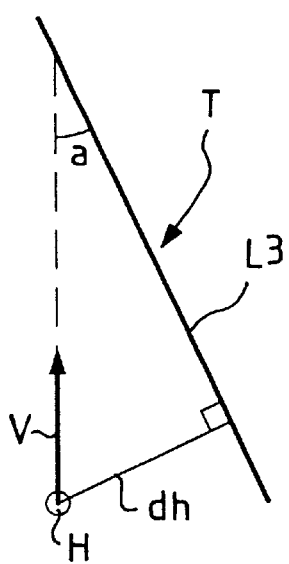
FIGS. 2A, 2B and 2C illustrate similar representations to those of FIGS. 1A, 1B and 1C respectively, for a relative position and a speed of the aircraft which are different.

The device 1 in accordance with the invention and represented diagrammatically in FIG. 1C is intended to provide an aid for the piloting of an aircraft, especially a rotary-wing aircraft, in this instance a helicopter H, by presenting cues which are useful in said piloting.

According to the invention, said device 1 which is on board said helicopter H comprises to this end:

means 2, comprising for example sensors and computers, for determining in a usual manner, on the one hand, the slope and the heading of a preset path T of the helicopter H and, on the other hand, the slope and the heading of a flight path which said helicopter H can take in order to join up with said preset path T; and means 3 linked by a link 4 to said means 2 and presenting, on a display screen 5, simultaneously a characteristic sign S1, for example a rhomb, whose position on said display screen 5 is representative both of the slope and of the heading of said preset path T and a characteristic sign S2, for example a circle, whose position on said display screen 5 is representative both of the slope and of the heading of said flight path.

In order to clearly highlight the relative position between the helicopter H and the preset path T, and to clearly explain the arrangement of the various signs on the screen 5 of FIG. 1C, we have represented:

in FIG. 1A, the projection onto a horizontal plane of the path T, of the position of the helicopter H and of the speed vector V of the latter, said speed vector V and said path T forming an angle a; and in FIG. 1B, the projection onto a vertical plane OXZ of said elements T, H and V.

The preset path T comprises a plurality of successive segments L1 to L4 of different slopes and headings. Segment L3 which is the closest, a horizontal distance dh and a vertical distance dv from the current position of the helicopter H, is regarded as the current segment, with respect to which the processings and presentations of cues specified below are carried out.

As may be seen in FIG. 1C, said display screen 5 also indicates:

a horizon line 6;

a slope (or pitching) scale 7;

a heading (or azimuth) scale 8; and a sign 9 illustrating the orientation of the speed vector V of the helicopter H and therefore indicating the direction in which the latter is flying.

In the vertical plane (FIG. 1B), the segment L3 exhibits a slope P, for example −8°. The sign S1 is therefore placed on the scale 7 at said slope P.

Moreover, in the horizontal plane (FIG. 1A), the segment L3 is oriented in terms of heading at a°, for example 5°, with respect to the heading of the helicopter H. The sign S1 is therefore placed on the scale 8 at a distance D representative of the value a°, as represented in FIG. 1C.

Said sign S1 therefore indicates directly the slope and the heading of the preset path T.

This sign S1 may possibly be accompanied by an indication regarding the origin of the preset path T, for example FMS as represented in FIG. 1C, to indicate that the path is calculated by a navigation computer on board the helicopter H, or ATC, to indicate that it is calculated by aerial control means provided on the ground and that it is transmitted by radio link to the helicopter H or to the means 2.

Additionally, the sign S2 provides an indication enabling the pilot to join up with the preset path T according to a predefined strategy. This sign S2 is centered on the screen 5 at a slope and at a heading (or at a slope discrepancy and at a heading discrepancy with respect to the sign S1) which are computed by the means 2 as being optimal given the distance (vertical distance dv and horizontal distance dh) which separates the helicopter H from the current segment L3 of the preset path T and given the manner in which it is desired that the helicopter H join up with said preset path T (soft approach or more direct approach).

By way of example, in the vertical plane OXZ, the helicopter H which is situated above the segment L3 will have to take a slope (for example −15) greater than the slope P (for example −8) of this segment L3, in order to be able to join up with the latter.

A similar situation occurs in the horizontal plane in respect of the heading values.

According to the invention, on the screen 5:

the discrepancy in slope p computed by the means 2, between the signs S1 and S2, is dependent on the vertical distance dv; and the discrepancy in heading r between these signs S1 and S2 is dependent on the horizontal distance dh.

Within the context of the present invention, said means 2 may use various laws, especially as a function of the chosen approach strategy, to compute the values p and r from the values dv and dh.

However, in a preferred embodiment, these values are computed from the following relations:

if dv>25 m, p is proportional to $\sqrt{dv}$ if dv<25 m, p is proportional to dv/5 if dh>25 m, r is proportional to $\sqrt{dh}$ if dh<25 m, r is proportional to dh/5.

Thus, by virtue of the invention, the piloting of the helicopter H consists simply in making the sign 9 indicating the direction in which the helicopter H is flying coincide with the sign S2, thereby enabling said helicopter H to join up with and follow the preset path T. Naturally, when it joins up with this path, the signs S1 and S2 are centered on the same point of the screen 5.

According to the invention, the screen 5 moreover comprises a sign S3 formed of two lines linking the center of the sign S1 to the ends of the sign S2 (that is to say to tangents to the circle forming said sign S2).

This sign S3 gives a simple representation in perspective which suggests the course to be followed in order to join up with the preset path T.

FIGS. 2A and 3A, 2B and 3B, 2C and 3C represent figures which are similar to FIGS. 1A, 1B and 1C respectively, but which illustrate situations and positions where there is a difference between the helicopter H and the preset path T.

Figure 2B:
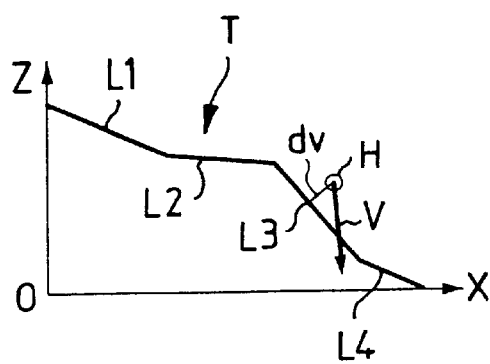
Figure 2C:
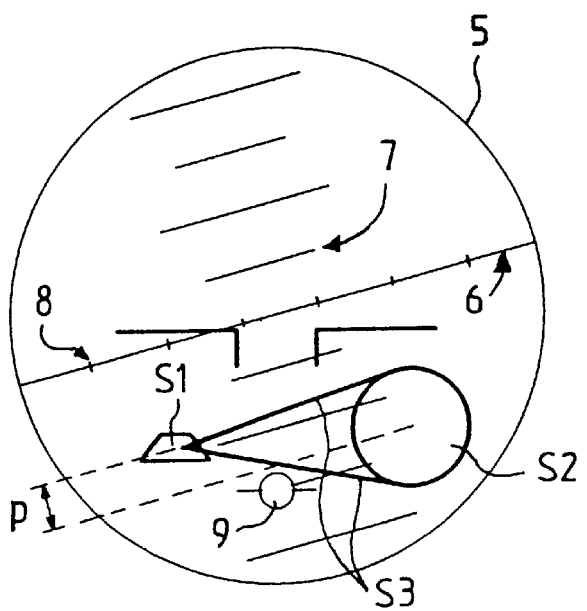

In FIGS. 2A, 2B and 2C, the situation is close to that illustrated in FIG. 1C, the helicopter H is situated above the segment L3, but it exhibits a slope which is slightly greater than that of this segment.

FIGS. 3A, 3B and 3C illustrate a situation in which the helicopter H is situated inside a "preset tunnel" 10 representing a tubular shape centered on the current segment L3. Moreover the slope of the helicopter H is very close to that of this segment L3.

Consequently, the sign S1 is situated inside the sign S2, the signs S1, S2 and 9 being almost superimposed.

Within the context of the present invention, said signs S1 and S2 may exhibit different shapes.

By way of example, said sign S1 may in particular be:

a rhomb, as represented in FIGS. 1C and 3C;

a point which is not represented, thereby making it possible to prune the presentation on the screen 5; or a symbol illustrating a landing strip, as represented in FIG. 2C. This symbol can, for example, be presented solely when guidance is carried out with respect to the last segment L4 of the preset path T, which culminates at the landing point, so as to alert the pilot of the imminence of landing.

According to the invention, the means 2 can moreover determine a prediction speed, which can be equal to the sum of the current speed and of a value proportional to the derivative of the speed.

Figure 8:
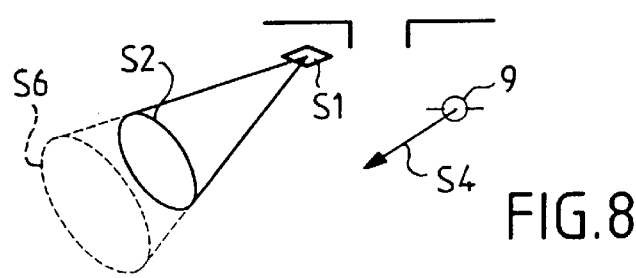

To illustrate this prediction speed, the screen 5 comprises a sign S4 represented in FIG. 8 and associated for example with the sign 9. This sign S4, for example an arrow, indicates the point in space which will be reached by the helicopter H within a specified duration, if it maintains its current accelerations constant.

Said sign S4 therefore enables the helicopter H to join up with the path T within said specified duration if the guidance superimposes the tip of the arrow S4 on the center of the circle S2.

This sign S4, which is merged with the sign 9 when the helicopter is flying in a straight line, can take a plurality of shapes, especially that of an arrow.

By way of example, it can take the shape:
of a two-dimensional symbol which is fixed and is situated at a distance in front of the helicopter H, corresponding to a specified duration of flight;
of a symbolic object representing a three-dimensional object in space, which is deformable as a function of the angle of sight and which is situated at a distance in front of the helicopter, corresponding to a specified duration of flight; or
of a symbolic object representing a three-dimensional object in space, which is deformable as a function of the angle of sight, but which is also spread over two distances corresponding to two specified durations of flight.

In the case where the preset path exhibits a curve, a corrected prediction speed is formed so as to maintain the helicopter H on said preset path, by carrying out the aforesaid piloting mode.

To this end, the prediction speed is corrected by a value which is dependent on the centrifugal force due to the turn imposed.

With a prediction speed thus corrected, as soon as the helicopter H enters the turn, the sign S4 is shifted outside the turn by the defined correction and the pilot must bring said sign S4 back onto the sign S2 in order to carry out the piloting in accordance with the invention. On exiting the turn, the correction is deleted.

This correction therefore gives a piloting indication enabling the pilot to start turning in time, without waiting to be off the preset path to receive the order to return thereto.

Additionally, the sign S2 can be an ellipse of variable configuration, that is to say of variable shape and/or variable dimension.

In a first embodiment, the shape of the ellipse varies as a function of the angle of rotation of the circle formed by the preset tunnel 10 represented in FIG. 3A, with respect to the axis of aim of the center of this circle from the helicopter H.

Additionally, during piloting, when the speed of the helicopter H is relatively low, a side wind may subject the latter to a sides lip which may in particular cause the signs 9 and S4 to exit the field of view represented on the display screen 5. The pilot then no longer sees the sign 9 or S4 which he must bring to the center of the circle S2 for the piloting in accordance with the invention.

To remedy this drawback, in the example represented in FIG. 4 where the signs 9 and S2 exit sideways with respect to the plane of the screen 5, that is to say in the direction of heading, two auxiliary signs 9ad and S2ad are provided, situated on the screen 5, at a predetermined distance Ra, from said signs 9 and S2 respectively, along said direction of heading, but at the same slope as said signs 9 and S2.

The piloting then consists in bringing said auxiliary sign 9ad into superposition with said auxiliary sign S2ad.

It will moreover be noted that:
the distance Ra is, for example, equal to the length of the radius of the circle forming the screen 5;
when the guidance is carried out, not by means of the sign 9, but by means of the sign S4, it is possible to provide a similar additional sign associated with said sign S4; and
when exit takes place vertically, additional signs are provided, offset in the slope direction, at the same heading as the signs S2, 9 and/or S4 which have exited.

Figure 5:
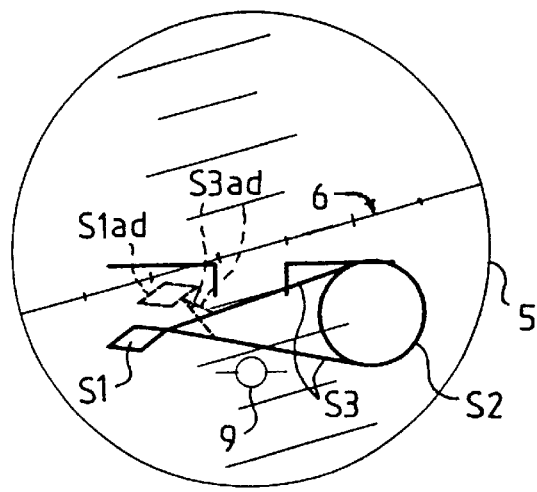

Furthermore, as may be seen in FIG. 5, there may be provision according to the invention for an extra additional sign S1ad intended to warn the pilot of a next change of the current segment of the preset path T, for example the next passage from the segment L3 to the segment L4.

This sign S1ad is set in place at a specified duration before the scheduled change.

As the point of change is approached, that is to say the present position on the current segment (L3 for example) approaches the next segment (L4 for example), the sign S1 approaches said additional sign S1ad.

When the change is made, the two signs S1 and S1ad are superimposed and said sign S1ad disappears.

Furthermore, an extra additional sign S3ad illustrating the course to be followed can be associated with said additional sign S1ad.

By way of example, the various auxiliary or additional signs 9ad, S1ad, S2ad and S3ad can exhibit the same shape as the signs 9, S1, S2 and S3 with which they are associated, but with a representation as dashes.

Figure 7A:
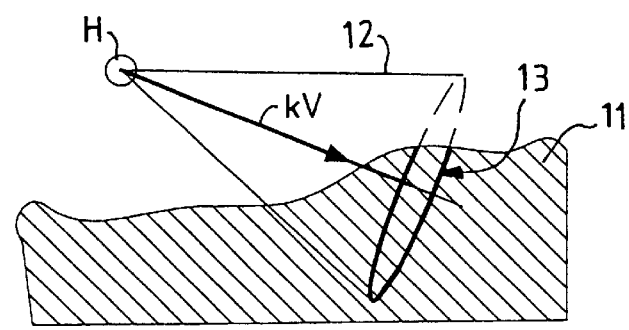
Figure 7B:
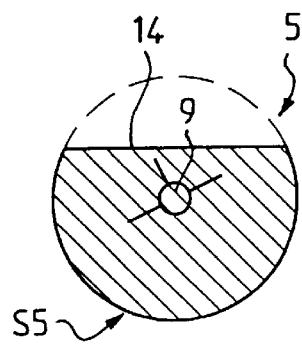

Additionally, to aid the pilot in controlling and maintaining the helicopter at an appropriate speed, a sign S5 is provided which is centered around the sign 9 indicating the direction of the speed vector V of the helicopter H, as represented in FIG. 7B.

Its shape is designed to inform the pilot of the relative position of the ground 11 with respect to a region in space connected with the helicopter H, by displaying directly the intersection with the ground of a conical volume 12 centered on the speed vector V. This solution assumes that the means 2 know the distance from the ground in this direction, either with the aid of a radar or laser telemeter, or with the help of a radio probe and/or a digitized terrain database.

Said sign S5 is composed of a circle of fixed diameter centered on the sign 9 and of a chord 14 of this circle, whose height is dependent on the intersection between the cone 12 and the ground 11.

The cone 12 exhibits a length kV, k being a value which is for example proportional to the current slope of the helicopter H and V being the speed of the helicopter H.

Figure 6A:
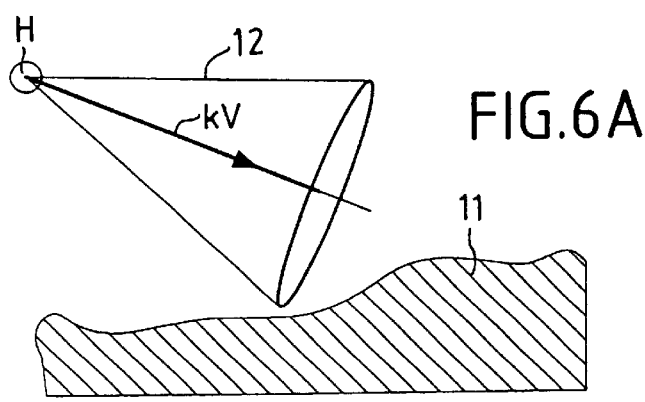
FIGS. 6B and 7B each show a speed limitation indication, for situations represented in FIGS. 6A and 7A respectively.
Figure 6B:
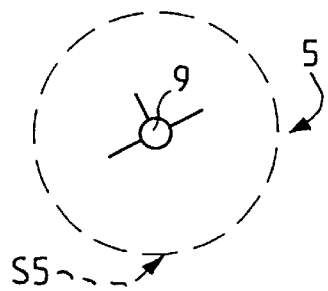

Naturally, as long as said cone 12 does not touch the ground 11 (FIG. 6A), the sign S5 does not appear (FIG. 6B). In FIG. 6B, the position which said sign S5 would take if it were present has been indicated by dashes.

On the other hand, when the cone 12 touches the ground 11, as illustrated by a part 13 drawn thicker in FIG. 7A, said sign S5 appears on the screen 5 (FIG. 7B). The height of the chord 14 in the circle forming the sign S5 therefore depends on the size of said part 13.

This sign S5 enables in particular the pilot to descend with a given slope at any speed and to retain this speed until the cone 12 touches the ground 11, this being depicted by the chord 14 or intersection bar which will climb in the circle. He will then have to slow down until this chord 14 is level with the sign 9, hence until it becomes a diameter of the circle illustrated by dashes in FIG. 6B, and will have to Be control his speed in order to retain the chord 14 at this level.

It will be noted that when the length of the cone 12 depends on the slope, the aforesaid symbology has the advantage of aiding the pilot by imposing a maximum speed on him, as a function of the slope which he actually takes, even if this slope is not that of the preset path T. This amounts to advising him of a descent slope, and for any slope taken, of a maximum speed not to be exceeded, even if the slope followed is not the advised slope. The device 1 therefore imposes a speed on him only when proximity to the ground 11 so demands, that is to say when it is vital to slow down so as not to hit the ground 11.

This symbology (sign S5) therefore represents important advantages, not only to ease piloting, but also for safety.

Additionally, if the sign S2 is an ellipse of size and position varying with speed, provision may be made, as represented in FIG. 8, for a second ellipse (sign S6) drawn dashed, which is also centered on the course to be followed, but at a distance from the ellipse S2 which is dependent on the difference between the actual speed of the helicopter H and a preset speed determined by the means 2.

Piloting then consists in superimposing the ellipse S6 on the ellipse S2 and therefore in bringing the actual speed of the helicopter H to said preset speed.

It will be noted that in the example represented in FIG. 8, as the ellipse S6 is of larger size than the ellipse S2, the actual speed of the helicopter H is greater than its preset speed.

It will furthermore be noted that the means 2 can be associated with a usual so-called "head down" screen or with a usual so-called "head up" screen.

The "head down" display has the advantage of adapting easily to numerous helicopters or aeroplanes already equipped with electronic screens, of "EFIS" type. These screens present secure piloting cues. However, their use near to the ground constrains the pilot to abandon sight of the exterior so as to look at his dashboard, this generally being deemed by him as incurring a risk. The cues presented must therefore be accurate, clear and easily interpretable so as to compensate for the loss of exterior sight, this naturally being the case with the device 1 in accordance with the invention.

On the other hand, the advantage of a "head up" screen is that it renders compatible a "natural" piloting and an "instrument-based" piloting, by associating these two modes with a single assisted natural mode of piloting. The assistance proposed is incorporated into the natural piloting so as to enhance it, while disturbing it as little as possible. The "fly by instruments"/"fly by sight" transition is thus eased.

It will be noted that the use of a head up visor ("HUD":"Head Up Display") in a civil helicopter is an alternative solution to automatic piloting during the approach. In principle, the pilot replaces the servocontrols, the HUD/pilot pair fulfilling the function of the automatic piloting.

During the approach to the ground, the "head up" guidance exhibits two fundamental benefits for the pilot:
 to be able to acquire a cue regarding the helicopter without switching his gaze to the interior of the cabin; and
 to obtain a flight cue superimposed on the real world and in correspondence therewith, thereby exempting said pilot of the need to make the intellectual correlation between the symbolized cue and the exterior visual markers.

The "head up" display makes it possible moreover, if necessary, to improve the perception of the exterior world, through the presentation of an artificial visual image, thereby enabling the pilot to regain the concepts of relief and space in a natural way.

What is claimed is:

1. A device for aiding the piloting of an aircraft, said device comprising:
 first means for determining the slope and the heading of a flight path which said aircraft can take in order to join up with a preset path; and
 second means for presenting, on a display screen, a second characteristic sign, whose position on said display screen is representative both of the slope and of the heading of said flight path,
 wherein said first means determine the slope and the heading of the preset path of the aircraft, in that said second means present, simultaneously with said second characteristic sign, a first characteristic sign, whose position on said display screen is representative both of the slope and of the heading of said preset path, and in that said slope and said heading of the flight path are such that the distance between said first and second characteristic signs on said display screen is dependent:
  according to a first direction representing the heading, on the distance in a horizontal plane between the position of the aircraft and said preset path; and
  according to a second direction representing the slope, on the distance in a vertical plane between the position of the aircraft and said preset path.

2. The device as claimed in claim 1, wherein said second means present, on said display screen, a third characteristic sign linking together said first and second characteristic signs.

3. The device as claimed in claim 1, further comprising another characteristic sign that indicates on the display screen the direction in which the aircraft is flying.

4. The device as claimed in claim 1, further comprising another characteristic sign that indicates on the display screen the direction of a point in space which will be reached by said aircraft within a specified duration.

5. The device as claimed in claim 1, wherein said present path comprises a plurality of successive segments and in that the one of said segments which is the closest to the position of the aircraft is used to determine the slope and the heading of said present path.

6. The device as claimed in claim 1, wherein said second characteristic sign exhibits the shape of an ellipse, of variable geometric configuration.

7. The device as claimed in claim 1, further comprising another characteristic sign which is displayed on the display screen and which is associated with said second characteristic sign and spaced therefrom by a distance dependent on the difference between the actual speed of the aircraft and a preset speed.

8. The device as claimed in claim 1, wherein said second means present on said display screen, at least one auxiliary sign which is intended to deputize for one of said characteristic signs which has exited the field of view represented on said display screen and which is situated, according to a field exit direction, at a predetermined distance from the actual position of said exited characteristic sign.

9. The device as claimed in claim 1, wherein said second means present on said display screen, at least one first additional sign warning of a modification, within a predetermined duration, of the preset path.

10. The device as claimed in claim 1, further comprising an additional sign displayed on the display screen which indicates the position of the ground relative to a zone in space connected with said aircraft.

11. The device as claimed in claim 1, wherein the discrepancy in slope p and the discrepancy in heading r between said preset and flight paths satisfy the following relations which depend on the distances dv and dh in meters m respectively in the vertical plane and the horizontal plane between the position of the aircraft (T) and said preset path (T):

if dv>25 m, p is proportional to $\sqrt{d}$ if dv<25 m, p is proportional to dv/5 if dh>25 m, r is proportional to $\sqrt{dh}$ if dh<25 m, r is proportional to dh/5.

12. The device of claim 1, wherein the aircraft is a rotary-wing aircraft.

13. The device of claim 12, wherein the aircraft is a helicopter.

* * * * *